Aug. 27, 1963

L. M. HUBBY 3,101,614

PNEUMATIC CONTROL SYSTEM

Filed Nov. 4, 1959

Aug. 27, 1963  L. M. HUBBY  3,101,614
PNEUMATIC CONTROL SYSTEM
Filed Nov. 4, 1959  7 Sheets-Sheet 3

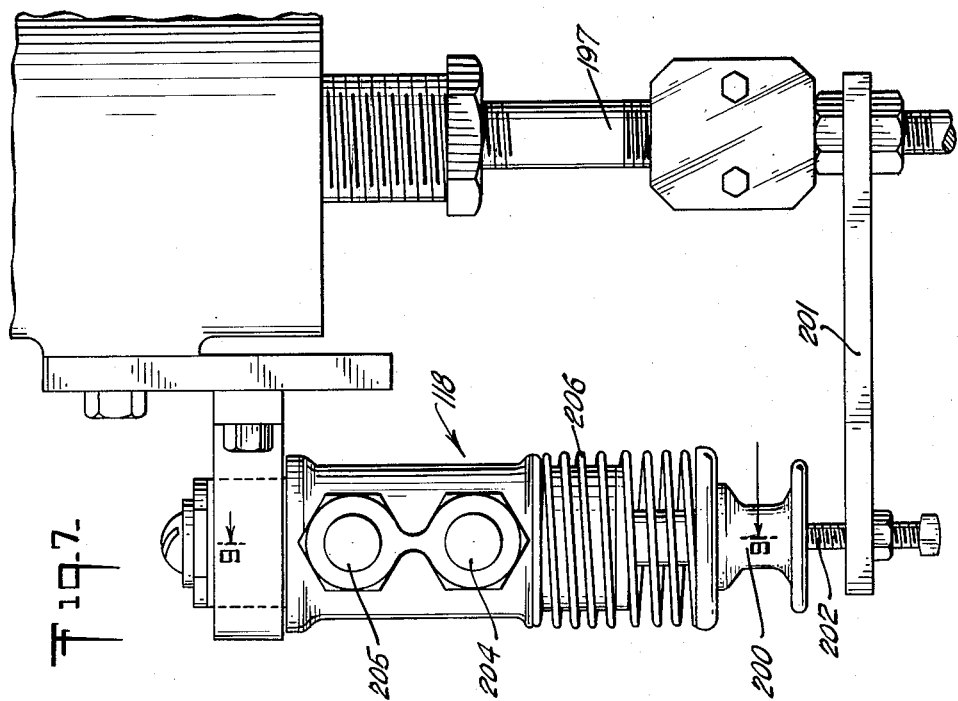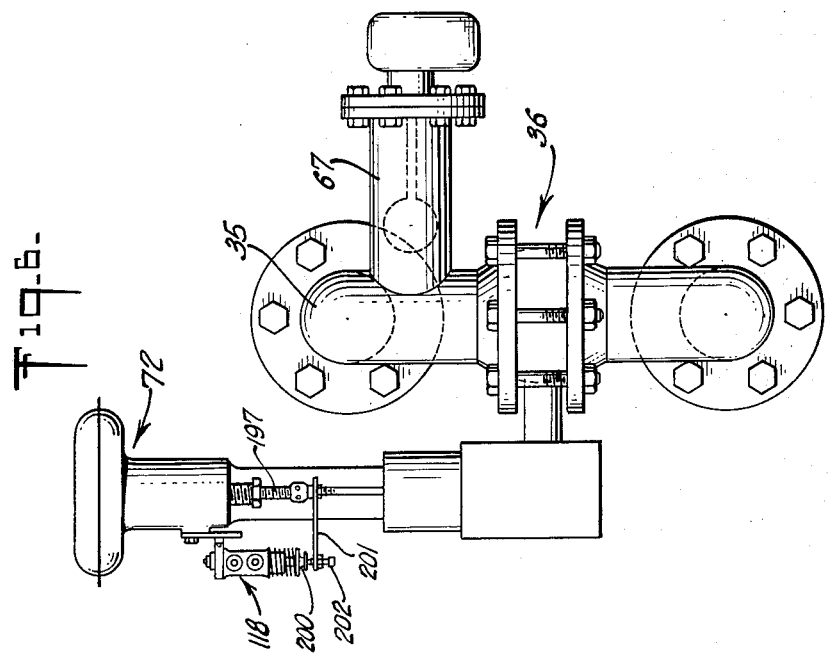

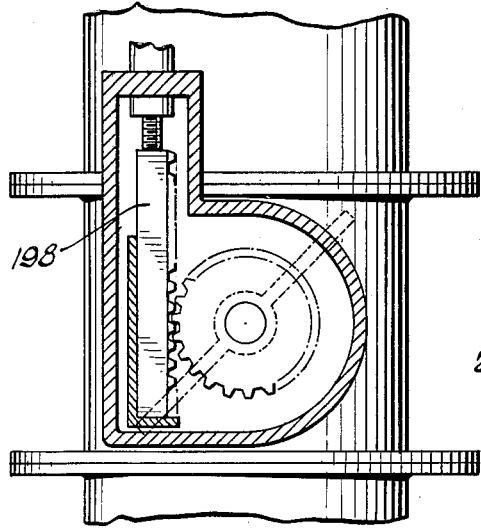
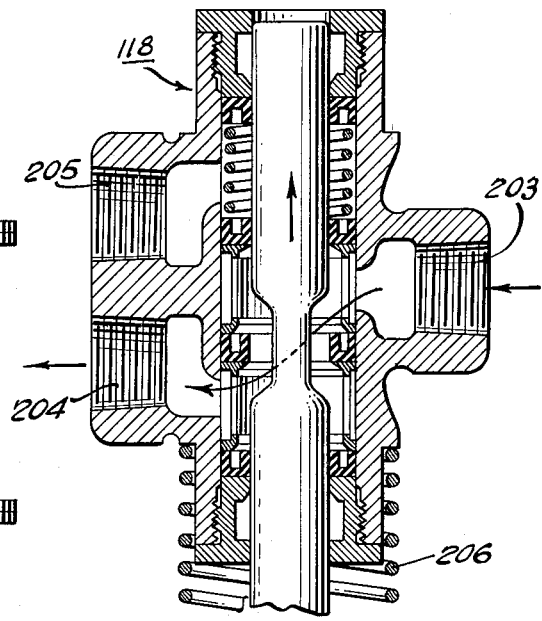
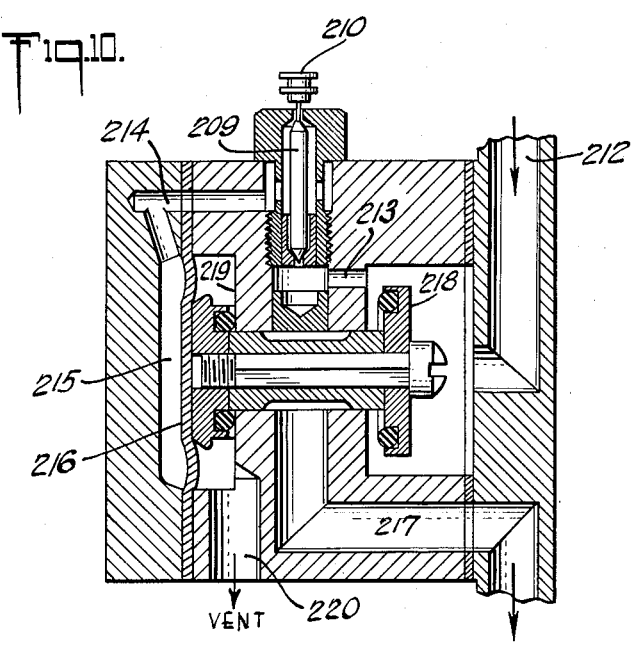

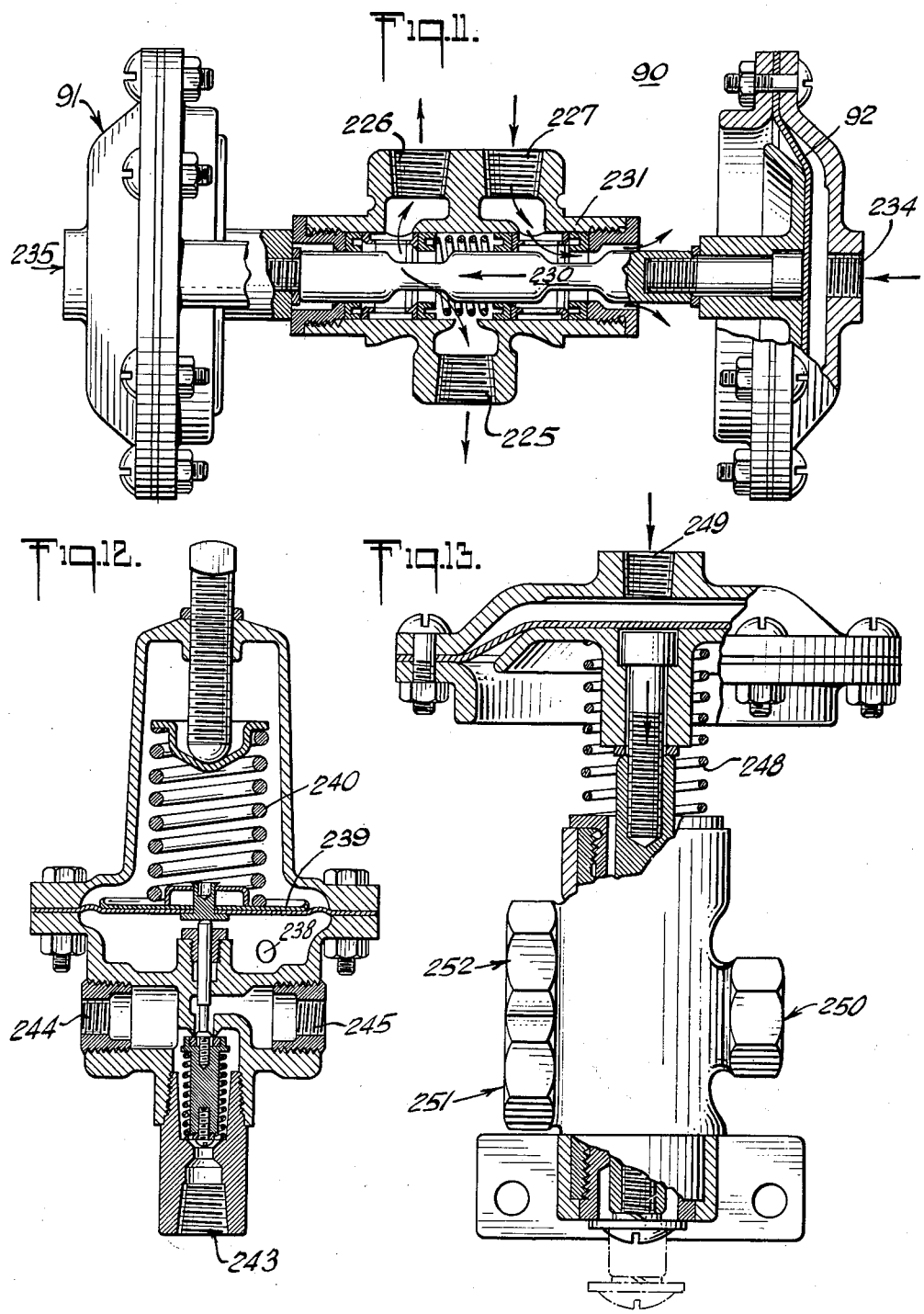

United States Patent Office 3,101,614
Patented Aug. 27, 1963

3,101,614
PNEUMATIC CONTROL SYSTEM
Laurence M. Hubby, Bellaire, Tex., assignor to Texaco Inc., New York, N.Y., a corporation of Delaware
Filed Nov. 4, 1959, Ser. No. 850,827
6 Claims. (Cl. 73—224)

This invention is concerned with automatic fluid measurement and delivery systems in general. More specifically, the invention concerns a fluid handling system that is particularly adaptable to automatic custody transfer, in petroleum fluids.

In automatic custody transfer systems, it is important that the arrangements be set up in a fool-proof manner such that under any conditions, e.g. temporary power failure or the like, the system will continue to operate without giving any errors of indication or measurement of the quantity of fluid delivered.

Custody transfer systems may be classified into two general categories; i.e. one, the measurements of fluid being delivered may be made by continuous flow metering, or two, the measurement may be made by an intermittent filling and draining of a measured volume container or tank. This invention is concerned with the latter type of custody transfer system, and is particularly beneficial in the ability to provide for automatic delivery in an intermittent manner while insuring against false counts of the number of quantities thus measured and delivered. In a system of this sort it is important to avoid either the counting of a volume of fluid when such volume is not delivered, or on the other hand a delivering of fluid that is in excess of a volume count.

Heretofore the problem has been attacked in one way by providing a mechanical connection, or tie, between the inlet valve and the drain valve of a measuring vessel so that when the inlet valve is open the drain valve will be closed and vice versa. Such approach to the problem is not practically feasible or readily adaptable to a system where the measuring vessel is of a substantial size. Consequently, this invention is especially adaptable to an intermittent volume measuring system where the vessel or tank that measures the volume delivered is of a substantial size, e.g. on the order of one hundred barrels.

Therefore, it is an object of this invention to provide a system for automatic custody transfer of a fluid, that involves the intermittent measuring of the quantity delivered by filling and draining a known volume receptacle. In addition, the system is particularly concerned with a pneumatic control circuit for the necessary "fill" and "drain" valve operation, and the like.

Another object of the invention is to provide an arrangement, in an intermittent measured quantity delivery system, for pumping the measured fluid to be delivered at a relatively steady rate, which is the average rate of fluid delivery during the intermittent measurement of the predetermined quantities thereof.

Briefly, the invention concerns a pneumatic control system for automatic custody transfer of a fluid. The system comprises in combination a known volume measuring tank and a fill valve for controlling the introduction of fluid to said measuring tank. The system also comprises a drain valve for controlling the removal of fluid from said measuring tank, and pneumatic control means for actuating each of the fill and drain valves. The system also comprises a pneumatic control circuit for actuating said pneumatic control means. The control circuit includes pneumatic interlocks for preventing the actuation of either said fill valve or said drain valve, to open position so long as the other valve remains in its opened position.

Again briefly, another aspect of the invention may be described as being concerned with an automatic custody transfer system which is one that has a principal supply source of fluid to be measured, as to the quantity thereof being delivered. Furthermore, such automatic custody transfer system is one that employs the filling and draining of a known volume receptacle in order to measure the quantity delivered. Thus, the invention may be described as comprising the following elements in combination: a pump for delivering said fluid from a sump after measurement thereof, a variable speed engine for driving said pump at an average rate that is equal to the average flow of said measured fluid, pressure responsive means for adjusting the speed of said engine, and means for introducing pressure to said last named means in accordance with the head on said principal supply source.

The foregoing and other objects and benefits of the invention will be appreciated more fully, in conjunction with a detailed description of a preferred embodiment of the invention. Such preferred embodiment is described below, and is illustrated in the drawings, in which:

FIG. 6 is an enlarged elevation of a system detail, illustrating the drain valve for the FIG. 1 system, and including pneumatically actuated control means for such valve in addition to showing a pneumatic valve that is included in the system; the pneumatic valve is actuated when the drain valve reaches its closed position;

FIG. 7 is a further enlarged system detail view, illustrating the pneumatic valve shown in FIG. 6 and providing more detail thereof; also this figure shows part of the pneumatically actuated valve actuator mechanism that is employed with the drain valve for opening and closing same;

FIG. 8 shows an enlarged detail elevation, partly in cross section, indicating in general the internal structure of the drain valve shown in FIG. 6;

FIG. 9 is an enlarged cross sectional view of the internal valve elements of the pneumatic valve shown in FIGS. 6 and 7; this view is taken along the lines 9—9 of FIG. 7.

FIG. 10 is an enlarged cross sectional view showing the internal structure of a pneumatic valve that is actuated by a fluid level actuated float; this valve is the type employed wherever fluid level controlled pneumatic valves are used in the FIG. 1 system;

FIG. 11 is an enlarged bottom view, partly in cross section, showing the structure of the double diaphragm four way valve illustrated in FIG. 3;

FIG. 12 is an enlarged longitudinal cross section illustrating a relay type pneumatic valve that is diaphragm actuated and that is employed in the system for actuating the main control valve;

FIG. 13 is an enlarged elevation partly broken away in cross section, illustrating a single diaphragm four way valve that is spring biased to one position thereof; there are two of these valves employed in the system and the internal valve structure is like that of the FIG. 11, double diaphragm valve;

Figure 14:
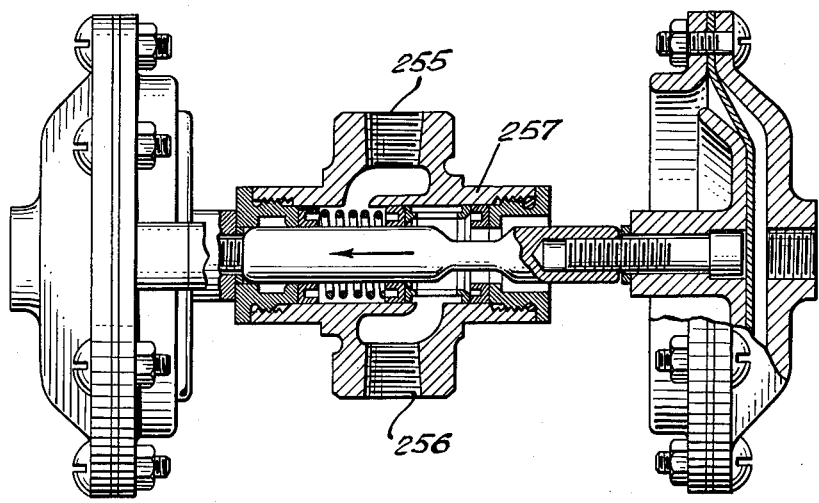
Figure 15:
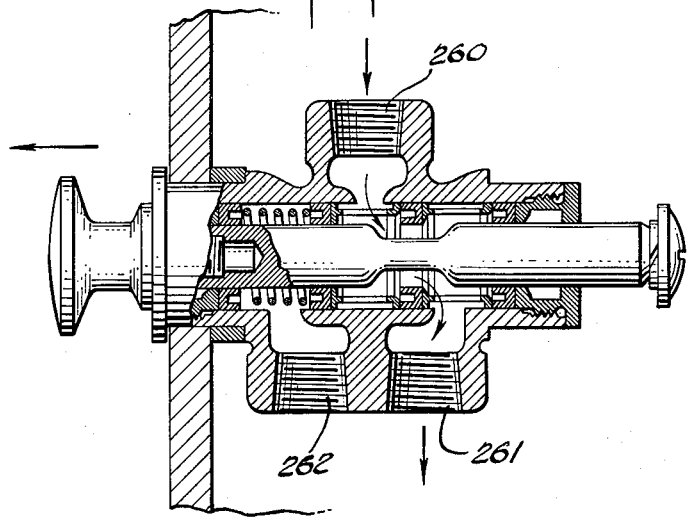

FIG. 14 is an enlarged elevation partly broken away in cross section, illustrating the elements of a double diaphragm three way pneumatic valve; there are two of these employed in the control system; and FIG. 15 is an enlarged detail elevation, largely in longitudinal cross section, illustrating one of the manually actuated pneumatic control valves; this is a three way valve, and there are two of them mounted on the control panel at the central portion thereof.

Figure 1:
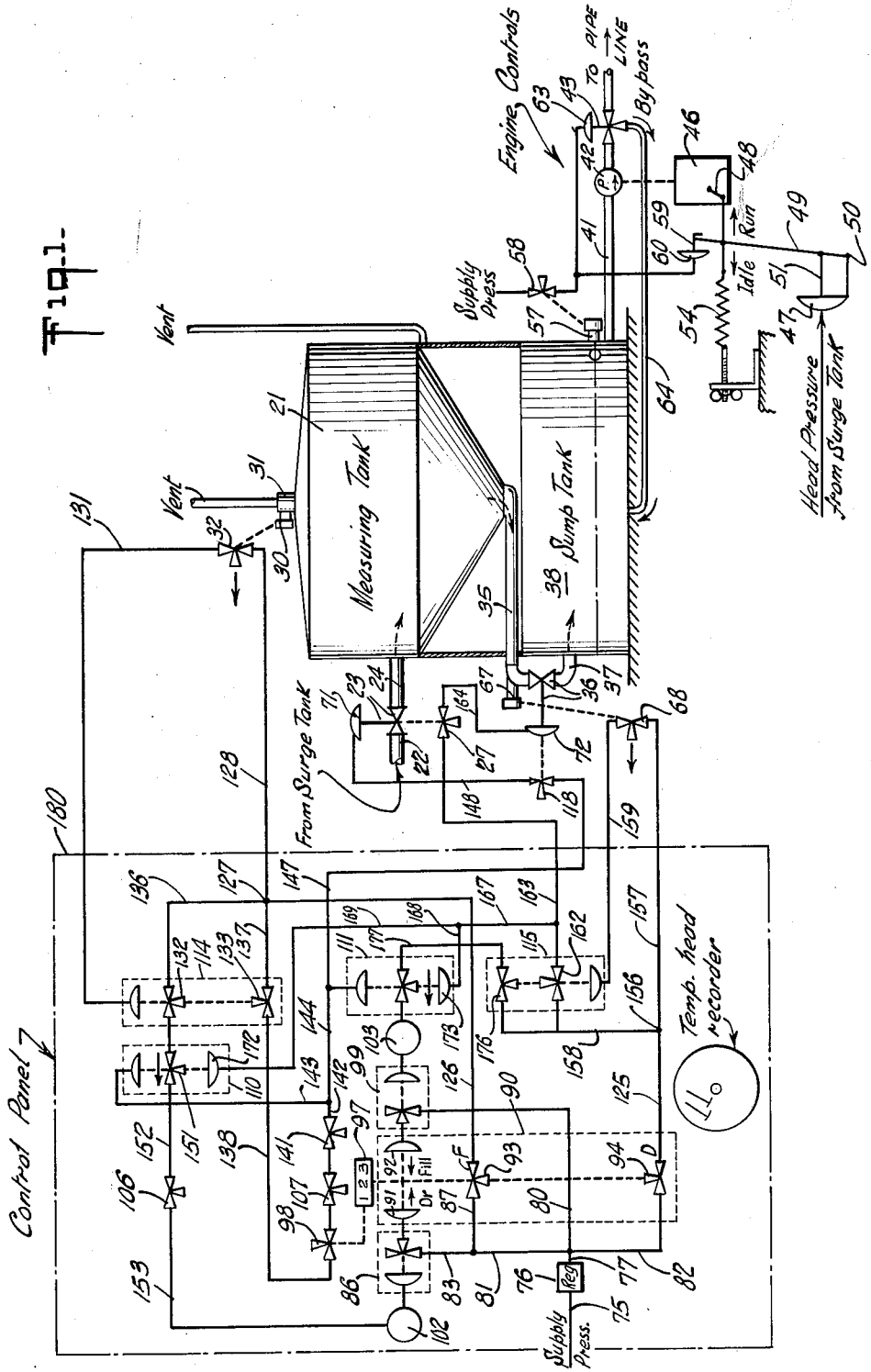
FIG. 1 is a schematic diagram illustrating all of the elements of a complete system according to the invention.

Referring to FIG. 1, the overall system and elements involved therein will be described first, as follows hereinbelow.

There is a measuring tank 21 that receives fluid to be measured from a predetermined source, such as a surge tank (not shown) as indicated by the caption. Tank 21 may have any predetermined volume for measuring the quantity of fluid therein, and as indicated above, the system according to this invention is particularly adapted to use with such a measuring tank having a volume on the order of one hundred barrels of fluid. Of course, the invention is applicable to measuring vessels having other and different volumes, as desired.

The tank 21 is filled by fluid that is introduced over a pipe 22 that is connected to a fill valve 23 which in turn is connected (at the outlet side thereof) to the tank 21 via another pipe 24. It is pointed out that there is a three way pneumatic valve 27 (schematically indicated in FIG. 1) that is mechanically connected to the fill valve 23 in such a manner as to be actuated from one position to another at the closing of fill valve 23, as will appear more fully below.

At the top of the tank 21, there is a float structure 30 that is subject to actuation by the float thereof when the fluid level in tank 21 reaches the location of the float. It will be observed that there is a relatively small diameter housing element 31 that contains the float of the float structure 30 so as to provide for maximum accuracy in connection with the volume of fluid in tank 21 when it has reached the level of the float. It will be observed that float structure 30 actuates a three way pneumatic valve 32. This is indicated by the dashed line connecting the symbol for valve 32, to the float structure 30.

At the bottom of the measuring tank 21 there is a drain pipe 35 which connects to a drain valve 36, which in turn may be substantially the same kind of valve as the fill valve 23, i.e. a pneumatically actuated valve that is mechanically biased to its closed position in the absence of pneumatic pressure applied thereto. Connected to the outlet side of drain valve 36, there is a pipe 37 that connects with a sump 38.

It will be appreciated that the sump 38 must have sufficient volume to be able to maintain the capacity thereof always sufficient to provide for draining the measuring tank 21 while the pumping out from the sump to a delivery point is carried out at any desired rate.

The fluid being delivered (and having the quantity thereof measured) is carried away from the sump 38 via a pipe 41 that leads to a pump 42 which in turn delivers the fluid via a three way outlet valve 43 for delivery to a customer via convenient means, e.g. a pipe line as indicated.

It will be observed that there are additional elements employed in connection with the delivery of the fluid from sump tank 38 to the customer. These elements include an engine 46 that drives the pump 42. The engine is preferably a gasoline motor, or other type of internal combustion engine. The speed of engine 46 is controlled by positioning the throttle thereof in accordance with the head pressure that exists on the surge tank which delivers the fluid to the measuring tank 21.

The latter elements act to control delivery of the fluid and this is accomplished by employing the schematically illustrated elements including a diaphragm 47 that is connected to receive pressure therein in accordance with the fluid head on the surge tank (as indicated by the caption). Diaphragm 47 is mechanically connected via any feasible linkage (such as that schematically indicated) to position a throttle lever 48 on the engine 46, by means of a lever arm 49. Arm 49 is pivoted at a pivot point 50, and is moved in accordance with the pressure on the diaphragm 47 by means of a connecting link 51. The throttle lever 48 is urged toward the throttle closing position by a spring 54 that has one end thereof anchored to some frame, or fixed reference point. It will be observed that if the pressure on the diaphragm 47 fails, the spring 54 will take over and move the throttle lever 48 to its idle position that is indicated by the arrow.

It is pointed out that with the indicated arrangement, the engine 46 will be maintained at a speed that is dependent upon the head pressure existing in the surge tank which supplies measuring tank 21. By this arrangement, the amount of fluid that is pumped out for delivery to the pipe line by means of pump 42, is varied in accordance with the head or level of fluid in the surge tank. In this manner the average flow of fluid being delivered will tend to be maintained at a rate which is equal to the average amount of fluid being intermittently delivered from the measuring tank 21 each time that it is filled. The result of such an arrangement is beneficial in that the power required for pumping fluid in delivering same, is held to a minimum since no excess of fluid is being delivered, over the quantity required in accordance with that being measured in an intermittent manner. Thus, it becomes quite feasible to arrange the system for a substantially continuous delivery of a fluid at a predetermined most desired rate, with the minimum of power required in so delivering the fluid.

There are some auxiliary elements involved in the arrangement for pumping the fluid as it is delivered. These include a float controlled valve housing 57. This contains a three way pneumatic valve as schematically indicated by a symbol 58, shown in connection with a pneumatic control circuit. Such control circuit is for actuating the delivery valve 43, as well as an idle override control element 59. The idle override element 59 is controlled or actuated by a pneumatic diaphragm 60 that is connected to the three way pneumatic valve 58, for receiving pneumatic pressure when the level of fluid in the sump 38 goes below a predetermined level as set by the location of the valve housing 57. There is a pneumatic actuator 63 for the valve 43. This actuator is connected in parallel with diaphragm 60 so that at the predetermined fluid level, valve 43 will be closed to the line and will connect the output of pump 42 to a bypass pipe 64. At the same time the element 59 will act to move the throttle lever 48 of the engine 46 to its idle position.

Returning to the measuring tank and its operation, it will be further observed that there is a float housing structure 67 that contains the float structure and connecting elements for actuating a pneumatic three way valve 68. Actuation of the valve 68 is used to provide a control function when the measuring tank 21 is at its empty condition, i.e. the level of the fluid in the drain pipe 35 goes below housing 67.

As indicated in greater detail in the FIG. 6 illustration, it will be noted that the float structure within housing 67 is connected to the drain pipe 35 at an angle thereto for avoiding any effect of turbulence during the fluid flow as it is drained.

The control system acts to automatically measure the quantity of fluid by filling tank 21 and emptying same, while taking a count of the number of dumps, or time that is carried out. The control system is pneumatic in nature and includes connections to each of a pneumatic actuation element 71 for the fill valve 23, and a similar pneumatic actuator 72 for the drain valve 36. Pneumatic control of these actuators acts to automatically maintain the filling and draining of the measuring tank 21 in a continuous manner, while at the same time the counting of the number of times that the tank is drained is carried out by a counter connection that will appear more specifically below.

The pneumatic control system is schematically illustrated in FIG. 1 by means of a single line diagram that includes the following elements, in addition to those already indicated. There is a pneumatic supply pressure line 75 that delivers pneumatic fluid under pressure to a regulator 76, which has the output side thereof connected via a pneumatic line 77 to three parallel pneumatic paths. These paths include a pneumatic line 80 and a line 81, as well as a line 82. In addition there is a pneumatic line 83 that is connected to a three way pneumatic valve (relay type) which is shown enclosed in a dashed line box 86. There is also a pneumatic line 87 that (like line 83) is directly connected to the common line 77 by means of line 81. Thus, as will appear more fully below, the three parallel pneumatic circuits include the circuit of pneumatic line 80, the circuit of pneumatic line 82 and also the circuit that includes lines 81, 83 and 87.

The pneumatic lines 82, 81 and 87 are actually joined together in a single pneumatic path, by reason of the structure of a control valve 90 that is shown schematically and that includes the elements enclosed in the dashed line rectangle (90). These elements include a "drain" diaphragm 91 and a "fill" diaphragm 92, in addition to a four way pneumatic valve structure. The four way valve is illustrated as two three way valves 93 and 94 respectively. This is done by way of convenience in connection with the pneumatic circuit diagram showing of FIG. 1.

The upper three way valve 93 is designated as the fill control valve (indicated by the letter F), while the lower three way valve 94 is designated as the drain control valve (D).

There is a mechanical counter 97 that is connected to the structure of control valve 90, so as to count the number of times that control valve 90 moves to its drain control position. Connected mechanically to counter 97, in turn, there is a pneumatic control valve 98 that may be set for actuation by the counter 97 only after a predetermined number of dumps of the measuring tank 21 have been made, so that the delivery of fluid may be automatically stopped at a given quantity (after the predetermined number of dumps) as desired.

The control valve 90 is actuated to either its drain, or fill, control position by means of pneumatic pressure supplied to the "drain" and "fill" diaphragms 91 and 92 respectively. This pneumatic fluid pressure is controlled by the use of two (relay type) diaphragm actuated pneumatic valves 86 and 99. Thus valves 86 and 99 are each three way valves that are actuated by introducing pneumatic fluid under pressure to the diaphragm thereof. In the absence of such pneumatic pressure, the valve in each case is spring biased to the opposite state. These are arranged so that the three way valve (of each) is actuated by the diaphragm actuator thereof (when pneumatic pressure is applied thereto) to connect the input pneumatic line, e.g. line 83 of the valve 86; to the output line therefrom, e.g. the line which leads to the drain control diaphragm 91 of the pneumatic control valve 90. On the other hand when no pneumatic fluid pressure is applied (to the diaphragm of valve 86) then a spring bias arrangement moves the valves to its other position which closes the pneumatic line (e.g. line 83) while it connects the output line (e.g. that leading from diaphragm 91) to the atmosphere to vent same.

In order to provide a predetermined time delay before the actuation of relay valves 86 and 99, there is a pneumatic volume tank 102 and 103 connected respectively to the pneumatic lines leading to the diaphragm actuators of the relay valves 86 and 99.

The rest of the pneumatic control system includes pneumatic supply lines as illustrated, in addition to a pair of manual three way pneumatic valves 106 and 107 that are connected into the system so as to arrest the automatic drain and fill operation of measuring tank 21, either in the full or in the empty condition, as desired.

The control system also includes a pair of double diaphragm actuated, three way pneumatic valves 110 and 111 (enclosed by dashed line boxes in FIG. 1). These valves operate in the control system to insure proper operation thereof, as will appear. There are also a pair of single diaphragm actuated, spring biased, four way valves 114 and 115 (also enclosed by dashed line boxes in FIG. 1). These are illustrated as two individual three way valves, for convenience in showing the pneumatic circuits, as was the case for the control valve 90.

There is a three way pneumatic valve 118, that is mechanically connected to the measuring tank's drain valve 36, for actuation thereby when the drain valve is in its closed position.

*Operation of FIG. 1*

It is pointed out that the schematic system showing of FIG. 1 indicates the elements required and the pneumatic interconnections therebetween, in order to provide for the automatic measuring operations as desired. It will be understood that each of the various elements of the system may be for the most part, commercial items that are conventional and readily available. Thus, a description of the system operation will be provided, without indicating the detailed structure of the elements employed; and then particular elements that may be used in the system will be described sufficiently to clarify and provide a working illustration of elements that may be employed for carrying out the system operation.

The system will operate automatically, to continuously carry out the process of filling and draining measuring tank 21, while providing a count of the number of times that the tank 21 is emptied, or dumped. However, there is provision for manually overriding the automatic operation, if desired, so as to stop the process with the measuring tank 21 either in the full condition or in the empty condition, as desired. In addition, there is provided a control from the counter element so as to stop the process of filling and dumping measuring tank 21 automatically after a predetermined number of dumps has been made.

As indicated above, the pneumatic control system is illustrated schematically by a line diagram in FIG. 1; which illustrates the pneumatic pipes and other pneumatic circuit connections, and employs dots where such pipes are interconnected.

The operation of the system will be made clear by following the control steps, and the condition of the various pneumatic valves in the system, as a complete cycle of filling and dumping of the measuring tank 21 is carried out. Thus, commencing with the operation as measuring tank 21 is in the process of being filled (by introduction of the fluid via pipe 22 and through the fill valve 23 to pipe 24 that leads into the measuring tank 21), it will be observed that the pneumatic control system is actuated by pneumatic fluid under pressure as introduced over the pneumatic line 75 and via the regulator 76 which is included in order to maintain a relatively constant pneumatic pressure on the control system. Consequently, pneumatic pressure is supplied continuously over the line 77 to the common connection point for pneumatic lines 80, 81, 82. In addition, pressure is supplied continuously over lines 83 and 87 that are connected in common to line 81. The distribution of the pneumatic pressure over the various pneumatic circuits, is then controlled by the various pneumatic control valves and other elements, to determine the action in connection with filling and draining of the measuring tank 21. Thus, pneumatic control valve 90 is a primary determining element as to the actuation of the various controls to set up and initiate the opening and closing of the fill and drain valves, as desired.

In accordance with the above, it will be assumed that the measuring tank 21 is filling by reason of fill valve 23 being pneumatically actuated to its open position, i.e. by having pneumatic pressure applied to the pneumatic actuating element 71 thereof. This application of pneumatic pressure is provided by reason of the fact that the control valve 90 stands in its "fill" position. In other words, the three way valve 93 is open for allowing pneumatic pressure to pass therethrough; while the other three way valve 94 is closed so that pneumatic pressure from line 82 is shut off, and the pneumatic pressure that existed on a pneumatic line 125 is vented to the atmosphere at three way valve 94.

The pneumatic pressure is therefore carried through three way valve 93 from pneumatic line 87 via another pneumatic line 126 to a common connecting point 127. From point 127 the pneumatic pressure is carried over a pneumatic line 128 to the input side of the three way valve 32, that stands in its open position since the fluid level in measuring tank 21 has not yet reached the float structure 30 (in housing 31) that controls the three way valve 32. Since the valve 32 is open, the pneumatic pressure is carried through the valve over another pneumatic line 131 to the diaphragm of the pneumatic actuator for the single diaphragm valve 114. Valve 114 is spring biased to a position such that a three way valve 132 thereof, is normally open while another three way valve 133 thereof is normally closed. However, under the presently described assumed conditions, the three way valve 132 will be closed and the other three way valve 133 will be opened because the diaphragm of the valve 114 has pneumatic pressure applied thereto. Consequently, pneumatic fluid flow due to pressure existing in a line 136, is cut off at the three way valve 132, while the pneumatic pressure on another pneumatic line 137 (connected to common point 127) is transmitted through the valve 133 to another pneumatic line 138 that leads to the three way valve 98 which is actuated under control of the counter 97, as was indicated above and will be more fully described below in connection with the details of the system elements.

Assuming the predetermined number of dumps has not been reached at this point, the three way valve 98 (controlled from counter 97) will be open and will allow pneumatic fluid pressure to pass directly to the manual valve 107. Manual valve 107 will be set in its open position, so that pneumatic pressure will pass through the valve 107 also. From here it passes directly to an auxiliary three way valve 141, and then on via a pneumatic line 142 to pneumatic lines 143 and 144 in common. The pressure in line 144 is transmitted via another pneumatic line 147, to the three way valve 118 that stands in its open position under the assumed conditions because the drain valve 36 is closed. Then, pressure is transmitted on over another pneumatic line 148 to the diaphragm (pneumatic actuating element) 71, of the fill valve 23. This will cause the element 71 to be actuated so that the fill valve 23 is held in its open position.

The pneumatic control system will remain in the above described state during the period when measuring tank 21 is being filled, and then it will automatically switch over to drain the measuring tank 21 after fill valve 23 has been closed. This will take place by reason of the action that is initiated by the float-actuated, three way valve 32, when the tank 21 is full. Thus, it is pointed out that when the float structure 30 is affected by the fluid level in the measuring tank 21, it will shift the three way valve 32 from its open condition to its closed condition. Consequently, pneumatic fluid flow due to pressure in pneumatic line 128, will be cut off at the valve 32; while the other pneumatic line 131 (that connects to the output side of the valve 32) will be vented to the atmosphere by the valve 32. This venting of pneumatic pressure on line 131 releases the diaphragm actuator of the valve 114 and allows the spring bias thereof to shift the three way valves 132 and 133 to their opposite positions, i.e. to the state such that valve 133 is closed at its input side while valve 132 is open.

It will be noted that the closing of valve 133 will cut off pneumatic fluid flow from line 137 through the valve, while it will vent the pneumatic pressure in line 138 and beyond. This venting of the pneumatic pressure from line 138 acts to remove pneumatic pressure from the pneumatic actuation element 71 of the fill valve 23 so that the mechanical (spring) bias of this valve will act to close same.

At the same time, the pressure that still exists in pneumatic line 136 will be transmitted through the now open three way valve 132 to a three way valve 151 of the double diaphragm actuated valve 110. This three way valve 151 stands in its open position by reason of the pneumatic pressure that was applied over the pneumatic line 143 during the time when the fill valve 23 was open. Therefore, pneumatic pressure is now transmitted via a pneumatic line 152 to the manual valve 106 that is set in its open position. Pneumatic fluid pressure then continues over a line 153 to the pneumatic volume tank 102 where a predetermined time delay is introduced.

After the pneumatic pressure has built up in the volume tank 102, it will be transmitted to the actuator of the relay type valve 86. Consequently valve 86 will be set to its open condition so as to pass pneumatic pressure from the line 83 to the "drain" diaphragm 91 of the control valve 90, via the valve structure of the relay valve 86. Introduction of pneumatic pressure to the diaphragm 91 will shift the control valve 90 from its preexisting "fill" position to the opposite state which may be designated the "drain" position for the valve. This shifting of the control valve 90 to its other position, closes the formerly open three way valve 93 and simultaneously opens the three way valve 94. The effect of these valve actions is that the pneumatic fluid pressure is now cut off at the valve end of line 87 and is vented from line 126 and beyond, by the valve 93. At the same time, pneumatic fluid pressure is now passed on through valve 94 (from pneumatic line 82) to the pneumatic line 125 and so to a common point 156. Fluid pressure is thus transmitted to a pneumatic line 157 and also to another pneumatic line 158. As a result of the foregoing, pressure is carried to the input side of the three way valve 68, which is at this time in its open position because the fluid in measuring tank 21 is above the float actuating mechanism 67 of the valve 68. Consequently, pneumatic pressure is transmitted through valve 68 to another pneumatic line 159 that is connected to the diaphragm actuator of the single diaphragm valve 115, which is spring biased to a normal state that is opposite to that taken up when pneumatic pressure is applied over the line 159.

This means that a three way valve 162, of the single diaphragm valve 115, will be shifted to its open position and consequently pneumatic pressure will be carried through the valve 162 to a pneumatic line 163 that leads directly to the three way valve 27. Valve 27 at this time is in its open position, since the fill valve 23 is closed. Consequently pneumatic pressure is transmitted over a line 164 to the diaphragm, or pneumatic actuation element 72 of the drain valve 36. This pneumatic fluid pressure will therefore actuate the drain valve 36 to its open position. The pneumatic control element will then remain in this state (actuated to hold the valve 36 open) during the time necessary for the draining of measuring tank 21.

It will be observed that there is an additional pneumatic circuit that is energized when the three way valve 162 is open. This additional circuit includes a pneumatic line 167 that connects to lines 168 and 169 in common. This circuit transmits pneumatic pressure to one of the diaphragms of each of valves 110 and 111 in common so that these double diaphragm valves are set to prepare the system for future action while also providing for the need to complete a previous drain or fill cycle prior to the proceeding with the next succeeding cycle.

In other words the double diaphragm valves 110 and 111 are both shifted by means of the pneumatic line connection illustrated for setting up and controlling two conditions. One, so that the fill or drain operation may not again take place until the succeeding drain or fill, respectively, has been carried out. Thus for example, proceeding from the last described operation (where the measuring tank 21 has been set to drain) it will be noted that the double diaphragm valve 110 will have a diaphragm 172 thereof actuated, which will close three way valve 151 and simultaneously vent the pneumatic line 152 that is connected thereto. Because of this action, the control valve 90 cannot again be actuated to the "drain" position, until three way valve 151 has been shifted by application of pressure to the other diaphragm actuator thereof.

The second condition is set up at the same time, because pneumatic pressure has been applied via line 168 to a diaphragm 173 of double diaphragm valve 111. This shifts the valve 111 to its open position, so that the pneumatic circuit is cleared for admitting pressure to the relay valve 99 that will actuate the control valve 90 to the "fill" position thereof at that time.

The automatic switching back from the drain portion of a cycle to the next fill portion, is similar to the switching already described above in connection with going from "fill" to "drain." Thus, it will be clear that when the fluid has all drained from tank 21, the float mechanism in housing 67 will actuate three way valve 68 to its closed position. This will cut off pneumatic pressure at line 157 and vent the pressure existing in line 159. This, in turn, allows the single diaphragm actuated valve 115 to be returned to its normal, or mechanically biased position; so that three way valve 162 thereof will be closed at the upstream side and will vent the downstream side, while another three way valve 176 (of diaphragm valve 115) will be shifted to its open position and pneumatic pressure will be transmitted via a pneumatic line 177 and through the three way valve of double diaphragm valve 111, to the volume tank 103. At tank 103, the pressure will build up after a predetermined delay and cause actuation of the relay valve 99. Valve 99 will, in turn, provide for application of pneumatic pressure from line 80 to the "fill" diaphragm 92 of the control valve 90, which shifts the control valve to its "fill" position. This initiates the "fill" cycle, if the drain valve 36 has completely closed (or as soon as it does), by providing pneumatic pressure from three way valve 93 over the line 126, and on over the pneumatic circuit indicated above, which goes to the pneumatic actuator 71 of the fill valve 23.

The last mentioned circuit which was indicated previously, may be traced again to clarify the action that takes place as a fill cycle is initiated. Thus, pressure is transmitted on from line 126, via junction point 127 to pneumatic line 137. Then this circuit continues via the three way valve 133, which is open by reason of the concurrent actuation of single diaphragm valve 114, to the line 138; and then through the valves 98, 107 and 141 to the three way valve 118 (via lines 142, 144 and 147). As previously noted, valve 118 is connected mechanically to drain valve 36. In this manner, as soon as the drain valve 36 is completely closed, the three way valve 118 will be opened and pressure is then transmitted over the line 148 to the pneumatic diaphragm actuator 71 of the fill valve 23. Therefore valve 23 will be opened.

It is pointed out that the counter 97 is only actuated for one count each time that the control valve 90 is shifted to the "drain" position. Furthermore, it will not be shifted to the "drain" position again until after a fill cycle has been completed, following any given drain cycle. In addition, even though the supply pressure of pneumatic fluid should fail during any portion of the automatic fill and drain operation, the system arrangement is such that the control valve 90 will not be shifted until the proper portion of the actual filling and draining operation is reached. In this manner no spurious, or false count indication of measuring dumps will be possible.

It is also pointed out that the counter device 97 has connected thereto a mechanical output arrangement for actuating the valve 98 after any predetermined number of dumps has been reached. This is provided so that the system will automatically stop after such total number of dumps has been carried out.

*Operation of Continuous Fluid Delivery System*

The operation of the delivery of fluid from the sump tank 38 via pipe 41 to the ultimate consumer, e.g. to a pipe line; will be clear upon an understanding of the various elements involved in the control of the pump 42. However, the operation of this constant delivery system may be briefly reviewed by referring to FIG. 1; wherein it will be observed that the pump 42 is driven at varying speeds by means of the engine 46 that has the speed thereof controlled by throttle lever 48. The throttle lever position is controlled in accordance with the pressure determined by a connection from the surge tank, that supplies the fluid to the measuring tank 21. This pressure is applied to the diaphragm 47 and actuates the lever arm 49 by moving same about a pivot point 50. This is done by means of the link 51 connecting the arm 49 with the diphragm 47. Near the free end of the arm 49 it is connected to act against the spring 54 that tends to move the throttle lever 48 to its "idle" position. By operating in the foregoing manner, the capacity of pump 42 and the amount of power required to drive same, may be held to a minimum by providing constant flow delivery of the fluid at a rate that will equal the average rate of fluid delivery as it is being measured by intermittent flow in connection with the filling and draining of the measuring tank 21.

Thus, this controlled pumping rate acts to take into account the fact that if the head increases on the surge tank, the resulting flow into measuring tank 21 will be increased and therefore the rate of pump-out from sump tank 38 should be correspondingly increased. This will take place by reason of the increased head pressure causing a setting of the throttle lever 48 on engine 46 so as to increase the speed of drive of the pump 42.

It is pointed out that the delivery pumping system also includes an idle shut down arrangement. This arrangement is such that if the level of fluid in sump tank 38 goes below a predetermined height, the float mechanism in connection with the housing 57 will cause actuation of the three way valve 58. Consequently valve 58 will be opened to allow pneumatic pressure to be transmitted to the diaphragm actuator 63 of the pipe line valve 43 to close same. At the same time it will cause the opening of a bypass circuit from the valve 43 back to the sump tank 38, as illustrated. Also at the same time, the pneumatic pressure that is transmitted through the open three way valve 58, will be applied to the diaphragm 60 so as to actuate the element 59 that will override the action of the lever arm 49 (as it is being controlled by the surge tank head pressure) and will cause the throttle lever 48 of the engine 46 to be set to its "idle" position.

*Structure of System Elements*

Figure 2:
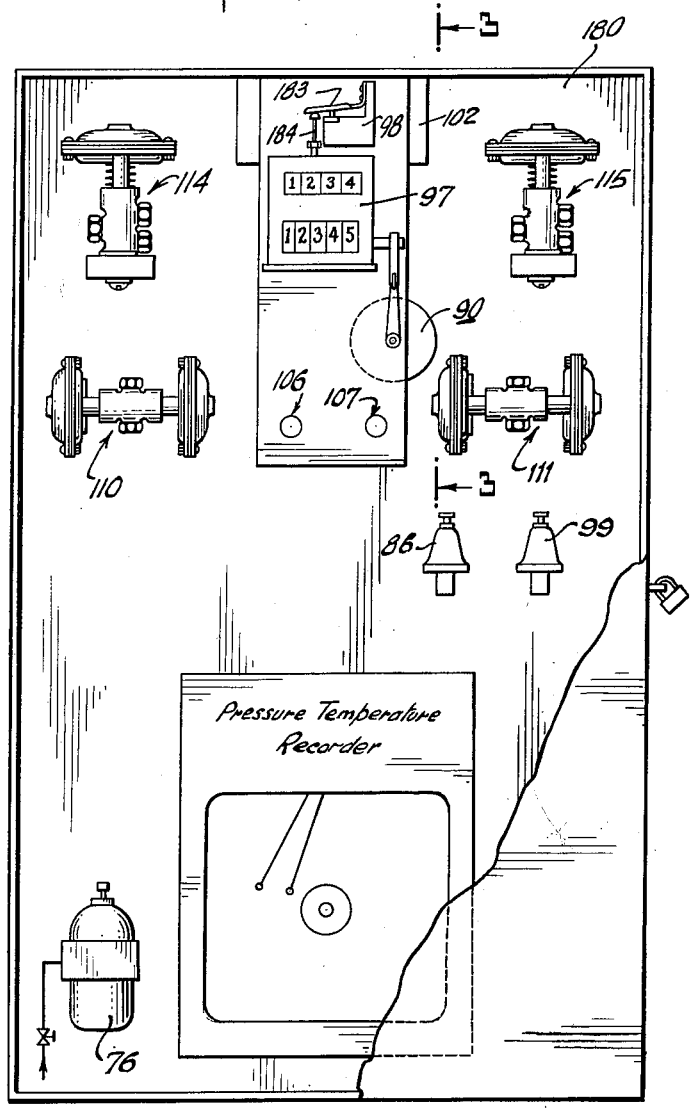
FIG. 2 is a front view, with the cover largely broken away, of a control panel cabinet that may be employed in connection with the system.
Figure 3:
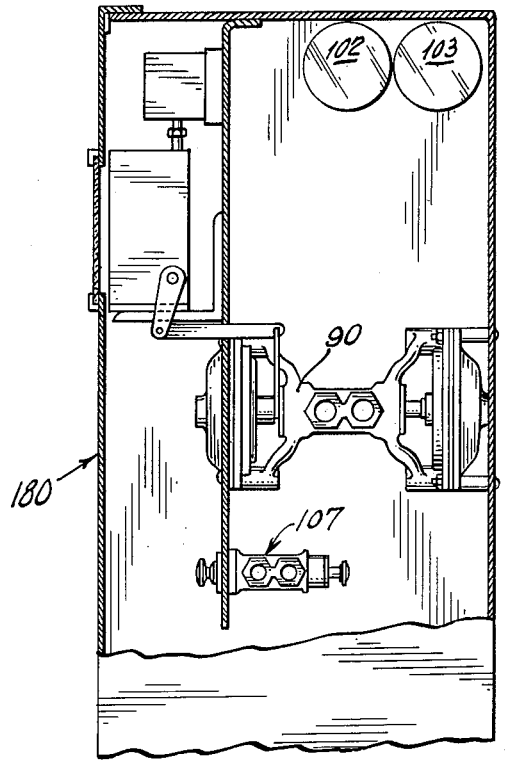
FIG. 3 is an enlarged side view partly in cross section of the upper portion of the control panel cabinet shown in FIG. 2, and taken along the lines 3—3 of FIG. 2 looking in the direction of the arrows.
Figure 4:
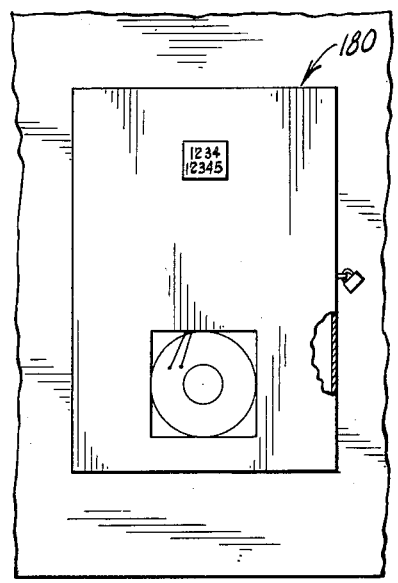
FIG. 4 is a reduced front view of the control panel cabinet, showing the cover thereon closed and illustrating the windows for observing a dump counter indicator as well as pressure and temperature recording indications.

It will be appreciated that many specific arrangements and structures for the elements employed in the system could be made with respect to the elements per se that are involved in the whole system (schematically shown in FIG. 1). However, by way of illustration and in order to be sure that the entire system operation is clear, a particular layout of one set of elements has been illustrated in the remaining figures of the drawings. Thus FIGS. 2, 3 and 4 illustrate the elements that are contained on a control panel 180; which elements have been enclosed by a dashed line (180) in FIG. 1. Wherever possible, the same reference numerals are employed, to indicate the various valves and other elements of the control system as it is illustrated in FIGS. 2, 3 and 4, as were employed in the schematic diagram of FIG. 1.

Figure 5:
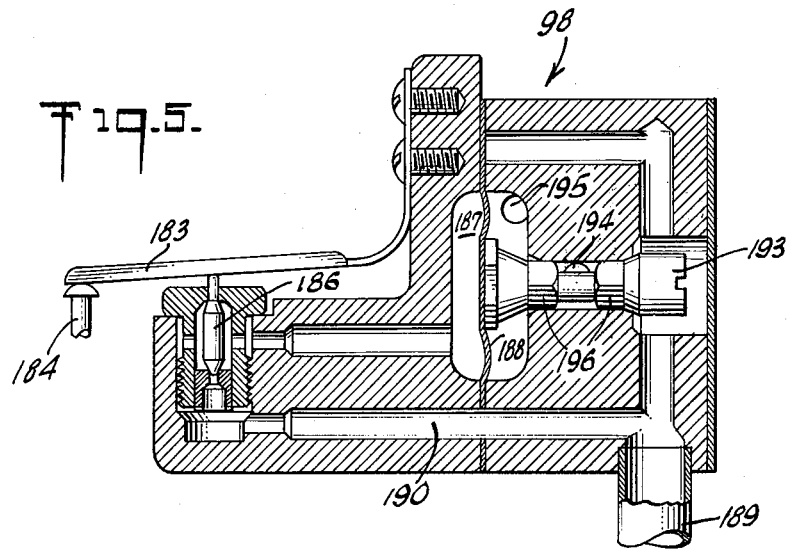
FIG. 5 is an enlarged cross section view, illustrating a pneumatic system valve that is employed to cut off delivery after a predetermined number of volume dumps have been made.

As with most of the elements per se of the pneumatic control system, the counter actuated three way valve 98 may take various forms; and the illustrated embodiment is merely shown by way of illustration of one particular type of valve that may be employed. Thus, the valve that is preferably employed for valve 98 is that illustrated in FIG. 5. This is a pneumatic, relay or pilot-valve actuated, type of valve that has an actuating arm 183. Arm 183 is moved by a plunger 184 in a pivotal manner. Plunger 184 is connected adjustably to the counter 97 in such a way that the plunger is moved longitudinally (downward, as viewed in the illustrations) when a predetermined number of "dump" counts have been made. It will be appreciated that the particular structure, in connection with the counter elements of counter 97, that actuates the plunger 184 is not material to this invention so that any desired structure (not shown) may be employed.

The structure of the actuator that moves plunger 184 is such that before the predetermined number of dumps has been reached, the plunger will be in its upward position so as to hold the arm 183 raised, in a generally pivotal manner, about its spring supported end (clearly illustrated). Such raising of arm 183 allows a pilot valve core 186 to be lifted off its lower end valve seat, and thus allows pneumatic fluid under pressure to flow via the illustrated passages into a chamber 187 on the left hand side (as viewed in FIG. 5) of a diaphragm 188 of the valve 98. Consequently, so long as the predetermined count has not been reached, the pneumatic fluid pressure as it exists in an input tube 189 will flow through a passage 190 and past the valve core 186 by unseating same. At the same time this pneumatic fluid pressure will hold the valve core 186 up so that the valve at the top of the core is closed, and so that pressure is transmitted into chamber 187. This pressure will cause the diaphragm 188 to be flexed and thus displace a main valve spool 193 to the right (as viewed in FIG. 5). This will open the valve at the right hand end (as viewed in FIG. 5) of spool 193, while closing the other valve on the left hand end thereof. This means that pneumatic fluid may now flow from the inlet tube 189 directly past the right hand end valve, of spool 193, and out through an outlet passage 194. At the same time, the closing of the left hand valve in connection with spool 193 will cut off the free passageway for pneumatic fluid flow that otherwise exists between the outlet passage 194 and a vent passage 195.

It will be observed that the hub of the valve spool 193 is made with a necked down central portion that joins two guide shafts 196 for permitting longitudinal sliding movements of the spool. These guide shaft portions 196 of the hub are square in cross section so that there is free passageway for flow of pneumatic fluid between either the outlet passage 194 and vent 195, or in the other direction between outlet passage 194 and the inlet tube 189. Which of these directions of fluid flow will be open, depends upon the position of valve spool 193 that has conical surfaces at the ends thereof that match valve seats at the ends of the circular cross section passage that carries the hub of spool 193 therein.

FIGS. 6, 7, 8 and 9 show some of the structural details of the drain valve 36 that is illustrated schematically in the system shown in FIG. 1. These details include the mechanically actuated three way "interlock" pneumatic valve 118 that is controlled by the actuating mechanism of valve 36 so that when the valve 36 is in its fully closed position, the pneumatic valve 118 will be opened. Valve 36 itself may be a commercially available type, such as one manufactured by Keystone that is a butterfly construction, and that is actuated by means that include a rack and pinion connection which is illustrated in FIG. 8. The actuating structure is arranged so that the valve is spring biased to its closed position. The actuator 72 that is schematically illustrated in FIG. 1 is preferably a pneumatically controlled diaphragm type actuator as indicated in FIG. 6. One such actuator that is commercially available is manufactured by Fisher.

The actuator 72 has an output shaft 197 that is connected to a rack 198 (FIG. 8) of the rack and pinion mechanism that actuates the butterfly valve structure of valve 36. Connected to the shaft 197 and moved thereby, is an arm 201 (FIGS. 6 and 7) that extends transversely from the shaft 197 and has an adjustable bolt 202 near the free end thereof for making contact with a handle or knob 200 of the pneumatic valve 118.

Valve 118 is a conventional, three way valve that has internal structure in accordance with the showing of FIG. 9 for providing valve connections. There is an inlet port 203 that may be connected with either one of two outlet ports 204 or 205, in the alternative. The valve is provided with a spring 206 to bias it into the "closed" position (insofar as the way in which it is used in the pneumatic control system of FIG. 1). Thus, as used in the system illustrated in FIG. 1, where the valve 118 is schematically indicated, the pneumatic line 147 will be connected to the port 205 while the line 148 will be connected to port 203. In this manner it will vent the pneumatic line 148, via port 204 when it is in the "closed" position; while it will connect the pneumatic lines 147 and 148 to one another when it is in its open position.

The adjustment of the bolt 202 will be set so that valve 118 will not be actuated to its open position until the drain valve 36 is fully closed, i.e., when the actuating shaft 197 is in its full-up position.

It will be appreciated that the other pneumatic "interlock" valve 27 (that is connected for mechanical actuation by the fill valve 23) may be essentially the same as the valve 118 that is shown in FIGS. 6, 7 and 9. Similarly, it will be clear that the "fill" valve 23 is substantially like the "drain" valve 36 including the pneumatic actuator therefor. The only differences would be those involved in mounting valve 23 in a horizontally situated pipe line as opposed to the situation of valve 36 in a vertical section of piping.

The float actuated valves may take various forms, and the particular type of such valve that is employed, forms no part per se of the invention. However, a particular type of relay actuated valve may be that illustrated in FIG. 10. Thus, referring to FIG. 10, there is a pilot-valve core 209 that is actuated by a float controlled arm 210. The action of this valve is such that when the fluid is below the level of the float, the arm 210 is held up by pivoting action from the float which is then in its downward position. Thus the core 209 is lifted and the valve at the free (lower) end thereof is opened, while the valve at the attached (upper) end is closed. This means that the pneumatic fluid pressure that is applied at a passage 212 can flow via a cross passageway 213, and then past the valve at the free end of core 209, to flow on through a passage 214 to a chamber 215 where a diaphragm 216 will be flexed by the pressure applied and will cause the main valve structure to be moved over to the position illustrated in FIG. 10. This then opens the main valve passageway through from the passage 212 to a passage 217 via the hexagonal shaped body of the main valve spool structure.

When the fluid level acts to lift the float, the arm 210 will be depressed and the core 209 will be correspondingly pushed downward which will seat the valve at the free end thereof and close same. This will cause the other valve (at the upper end of core 209) to be opened and vent the chamber 215. Consequently the main valve spool will be free to move to the left. This allows the main valve to be closed by the action of the pneumatic fluid flowing in passage 212 which will seat an O-ring type seal 218 while unseating a seal 219 on the other side of the valve spool. Unseating seal 219, connects the passage 217 with a vent passage 220.

FIG. 11 shows an enlarged bottom view of the body of control valve 90 that is illustrated in elevation in FIG. 3. It is pointed out that the structure of this valve is conventional, and will be clear to anyone skilled in the art upon an inspection of the FIG. 11 illustration which shows the interior elements by means of a longitudinal cross-section break away.

It will be observed that in actual structure this valve is a four-way type of valve. However, the operation is just as it was described in connection with FIG. 1, by reason of the fact that a common connection for the pneumatic lines 87 and 82 of the FIG. 1 diagram is used. In other words the pneumatic lines 82 and 87 (FIG. 1) are actually only one single pneumatic tube that is connected to an input port 225 of the actual valve structure for valve 90 that is shown in FIG. 11. There are two outlet ports 226 and 227 that are alternatively connected directly to the inlet port 225. At the same time the other of these two outlet ports is vented to the atmosphere, by means of the opening existing around the valve core 230 (double spool shape) that leads out the corresponding end of a valve body or housing 231 of the valve 90.

It is to be noted that the valve core 230 is moved longitudinally to either extreme position, by means of a pair of diaphragms 91 and 92, that are schematically indicated in the FIG. 1 system showing. The operation of the valve is such that either of the two positions taken up by the valve core, tend to remain in such position thereafter even though the pressure is removed, until another pressure signal is applied to the other of the actuating diaphragms 91 or 92. In other words it will be noted that there is no bias force on the valve core 230, and it will therefore remain in any given position until shifted by the application of pneumatic pressure to the retracted one of the actuating diaphragms 91 or 92. Thus, when pneumatic pressure is introduced via a port 234 to cause diaphragm 92 to be expanded; the core 230 of the valve will be shifted to its opposite position (from that illustrated in FIG. 11) and consequently the inlet port 225 will be directly connected only to the outlet port 227. Also, the other outlet port 226 will then be vented, by having a free passageway to the atmosphere past the seal at its end of the valve housing 231. The latter is so because the left hand reduced diameter portion of the core 230, will then be shifted to lie opposite the outer seal at that end. The core 230 and attached element will remain in this position, even after the pneumatic pressure that was applied at port 234 has been removed. Of course, the opposite action takes place when pneumatic pressure is applied to the diaphragm 91, via a corresponding port 235 at the other end of the valve structure.

FIG. 12 illustrates the structure of a valve that may be employed as either of the two relay-type valves 86 or 99 in the illustrated system. It will be observed that this valve has a diaphragm actuating port 238 for introducing pneumatic pressure that will act on a diaphragm 239, to lift same against the pressure of a coil spring 240. This action positions a three way valve that is clearly illustrated, and that has an inlet port 243 which is either shut off or connected to an outlet port 244; depending upon whether or not pneumatic pressure has been introduced at the port 238 (to cause diaphragm 239 to be expanded upward against the spring pressure of spring 240). When there is no pneumatic pressure applied beneath the diaphragm 239 (via port 238), then the spring 240 moves the internal valve core downward and closes the inlet port 243 while at the same time it opens the upper valve structure and so connects outlet port 244 with a port 245 which is left open as a vent. No further explanation of the structure of this valve is deemed necessary since this is a conventional valve, and it may be one manufactured by the Fisher Governor Company of Marshalstown, Iowa.

FIG. 13 illustrates one of the single diaphragm, spring biased type valves 114 and 115 of the illustrated system. It will be observed that there is a spring 248 that biases the valve to one extreme position in the absence of any pneumatic pressure applied to the diaphragm. The arrangement is such that the pneumatic pressure when applied to a port 249, will overcome the pressure of spring 248 and move the valve to its opposite extreme position, as indicated in FIG. 13 by the dashed line showing of the opposite (free) end of the valve core. It is pointed out that the internal valve structure for this valve is substantially the same as the internal valve structure illustrated in FIG. 11. Thus, the valve shown in FIG. 13 is also a four-way valve that will connect an inlet port 250 alternatively to either one of a pair of outlet ports 251 or 252, while the outlet port that is not thus connected with inlet port 250, is vented, or connected to the atmosphere as was indicated with the internal valve structure of the FIG. 11 valve.

FIG. 14 illustrates the structure for a three way, double diaphragm actuated valve that may be used as the valve 110 or 111 of the illustrated system. The structure is similar to the other valves illustrated, so that it is deemed sufficient to point out that there is an inlet port 255 that is either closed or is connected to an outlet port 256. When outlet port 256 is not connected to inlet port 255, it is vented by means of being connected for free flow through the right hand end of a body or housing 257 of the valve.

It will be observed that the valve illustrated in FIG. 14 is not spring biased to any given position, but will be actuated to either of its extreme positions by means of one or the other of the two diaphragms that are connected for moving the core (or spool) of the valve back and forth. In other words this valve, like the control valve 90 that was specifically illustrated in FIG. 11, will be actuated to one or the other of its two positions by having pneumatic pressure applied to a given one of the diaphragms thereof. Thereafter the valve core will remain in that position, even after the removal of pneumatic pressure on the actuating diaphragm, until the pneumatic pressure has been applied to the other diaphragm so as to move the core back to its first position again.

FIG. 15 illustrates the structure for a manually actuated, three way valve that may be the valve 106 or 107 in the illustrated system. Here again, the valve structure is quite similar to other valves described and illustrated above, and it is deemed merely necessary to point out that this three way valve operates to connect a port 260 to either of two other ports 261 or 262 in the alternative. When the valve is used in accordance with the system of this invention, the port 261 is used as the inlet port so that it is either connected to port 260 (when the valve is open) or it is closed. On the other hand, the port 260 (which is an outlet port) is either connected to inlet port 261 or it is connected to the other port 262 which will be left open as a vent.

While a preferred embodiment of the invention has been described in considerable detail, in accordance with the applicable statutes, this is not to be taken as in any way limiting the invention but merely as being descriptive thereof.

What is claimed as the invention is:

1. A pneumatic control system for automatic custody transfer of fluids comprising in combination a known volume measuring tank, a fill valve for controlling the introduction of fluid to said measuring tank, a drain valve for controlling the removal of fluid from said measuring tank, pneumatic control means for actuating each of said fill and drain valves, a first pneumatic valve, first fluid level responsive means at the full level of said measuring tank, a second pneumatic valve, second fluid level responsive means at the empty level of said measuring tank, means for actuating said first pneumatic valve in response to said first fluid level responsive means, means for actuating said second pneumatic valve in response to said second fluid level responsive means, a third pneumatic valve actuated by said fill valve when in the closed position, a fourth pneumatic valve actuated by said drain valve when in the closed position, a pneumatic control valve having two positions, pneumatic circuit means for connecting a source of pneumatic pressure to said control valve, a fifth pneumatic valve having a pneumatic actuator therefor, a sixth pneumatic valve having a pneumatic actuator therefor, additional pneumatic circuit means for connecting said control valve to each of said fifth and said sixth pneumatic valves for actuation thereof alternatively, said additional pneumatic circuits including a connection to each of said pneumatic actuators via said first and second pneumatic valves respectively, pneumatic circuit connections from said control valve via said fifth and sixth pneumatic valves and via said third and fourth pneumatic valves in series with each respectively for carrying pressure to said fill and drain valve pneumatic control means in the alternative, with interlock created by said third and fourth valves, and counting means connected to said control valve for indicating the number of times it is in the position for connecting pneumatic pressure to open said drain valve and deliver a tank of fluid.

2. A pneumatic control system for automatic custody transfer of fluids, comprising in combination a known volume measuring tank, a fill valve for controlling the introduction of fluid to said measuring tank, a drain valve for controlling the removal of fluid from said measuring tank, pneumatic control means for actuating each of said fill and drain valves, means for supplying pneumatic pressure to the system, a first pneumatic valve, first fluid level responsive means at the full level of said measuring tank, a second pneumatic valve, second fluid level responsive means at the empty level of said measuring tank, means for actuating said first pneumatic valve in response to said first fluid level responsive means, means for actuating said second pneumatic valve in response to said second fluid level responsive means, a pneumatic control valve for alternatively controlling the application of pressure to said pneumatic control means for each of said fill and drain valves, first pneumatic circuit means for connecting said first and said second pneumatic valves to said pressure supply means in order to switch said pneumatic control valve, and second pneumatic circuit means including a third pneumatic valve actuated by said fill valve when in closed position and a fourth pneumatic valve actuated by said drain valve when in closed position, second pneumatic circuit means comprising a series connection from said supply means to each of said pneumatic control means via the other one of said third and fourth pneumatic valves to provide an interlock to prevent simultaneous opening of both said fill valve and said drain valve.

3. A pneumatic control system according to claim 2 also having counting means actuated by said pneumatic control valve for counting the number of times it connects pneumatic pressure for opening said drain valve.

4. A pneumatic control system for automatic custody transfer of fluids, comprising in combination a known volume measuring tank, a fill valve for controlling the introduction of fluid to said measuring tank, a drain valve for controlling the removal of fluid from said measuring tank, pneumatic control means for actuating each of said fill and drain valves, means for supplying pneumatic pressure to the system, a first pneumatic valve, first fluid level responsive means at the full level of said measuring tank, a second pneumatic valve, second fluid level responsive means at the empty level of said measuring tank, means for actuating said first pneumatic valve in response to said first fluid level responsive means, means for actuating said second pneumatic valve in response to said second fluid level responsive means, a pneumatic control valve for alternatively controlling the application of pressure to said pneumatic control means for each of said fill and drain valves, first pneumatic circuit means for connecting said first and said second pneumatic valves to said pressure supply means in order to switch said pneumatic control valve, a third pneumatic valve actuated by said fill valve when in closed position, a fourth pneumatic valve actuated by said drain valve when in closed position, a second pneumatic circuit means for connecting said control valve to the drain one of said control means and having said third pneumatic valve in series therein, and a third pneumatic circuit means for connecting said control valve to the fill one of said control means and having said fourth pneumatic valve in series therein, said second and third pneumatic circuit means providing an interlock to prevent opening of either said fill or drain valves when the other is open.

5. A pneumatic control system for automatic custody transfer of fluids according to claim 2 further including a sump for receiving fluid drained from said measuring tank, a pump for delivering said fluid from said sump after measurement thereof, a variable speed engine for driving said pump at a steady rate equal to the average flow of said measured fluid, pressure responsive means for adjusting the speed of said engine, and means for introducing pressure to said last named means in accordance with the head on said principal supply source.

6. An automatic custody transfer system according to claim 5 including a throttle for controlling the speed of said engine, pressure responsive means for adjusting the setting of said throttle, means for introducing pressure to said last pressure responsive means in accordance with the head on said principal supply source, third fluid level responsive means in said sump, a fluid by-pass path from the output side of said pump to said sump including a fifth valve in the output stream for diverting the flow to the bypass path, second pneumatic circuit means including said third fluid level responsive means and means to actuate said fifth valve, and override means for setting said throttle to the idle position, all for idling said engine and recirculating said fluid if the level in the sump goes below a predetermined level.

References Cited in the file of this patent
UNITED STATES PATENTS

| | | |
|---|---|---|
| 1,688,812 | Huff | Oct. 23, 1928 |
| 2,240,775 | Heltzel et al. | May 6, 1941 |
| 2,687,817 | Browne | Aug. 31, 1954 |
| 2,773,556 | Meyers et al. | Dec. 11, 1956 |
| 2,872,817 | Pitts | Feb. 10, 1959 |
| 2,882,724 | Smith | Apr. 21, 1959 |
| 2,936,622 | Glasgow | May 17, 1960 |
| 2,966,798 | Smith | Jan. 3, 1961 |
| 2,977,796 | Pope et al. | Apr. 4, 1961 |
| 3,010,317 | Scott et al. | Nov. 28, 1961 |